Figure 1:
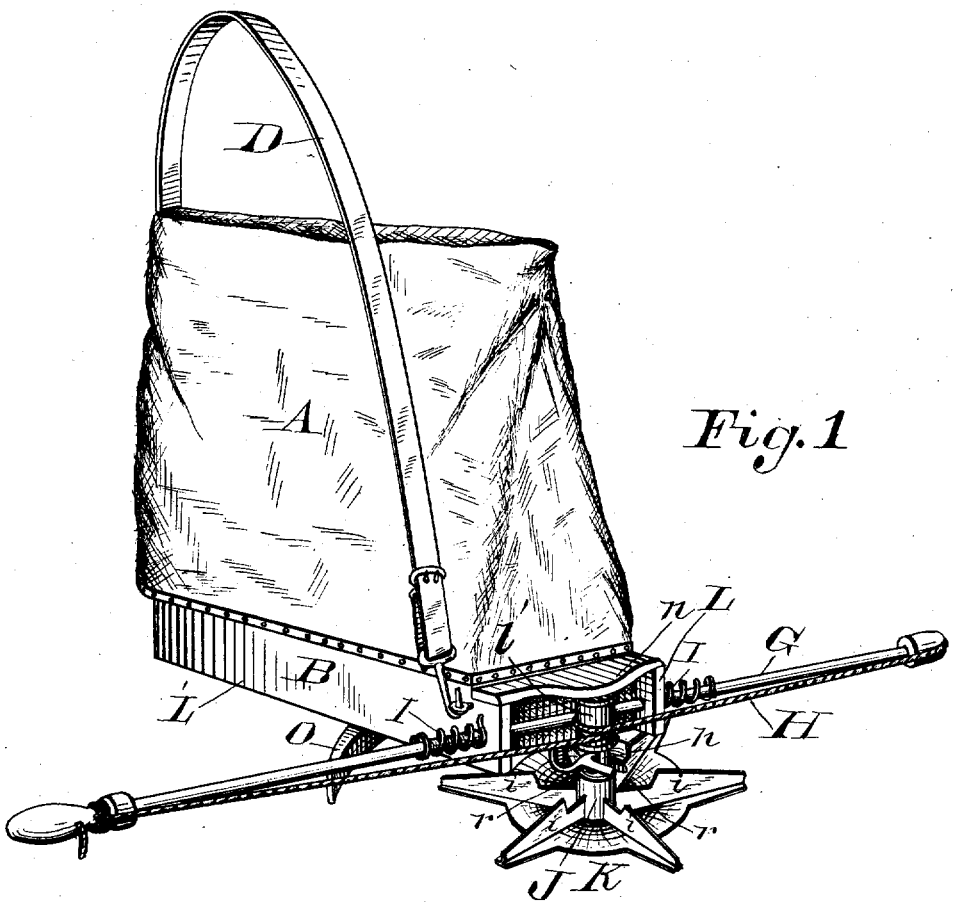

S. S. SPEICHER. 2 Sheets—Sheet 1.

BROADCAST SOWER.

No. 10,209. Reissued Sept. 26, 1882.

Attest

R. A. Staley

Frank Johnson

Inventor

Samuel S. Speicher

BY

H. Harrison

Attorney

N. PETERS, Photo-Lithographer, Washington, D. C.

S. S. SPEICHER.

BROADCAST SOWER.

No. 10,209. Reissued Sept. 26, 1882.

Attest
R. A. Staley
Frank Johnson

Inventor
Samuel S. Speicher
BY
H. Harrison
Attorney

N. PETERS, Photo-Lithographer, Washington, D. C.

UNITED STATES PATENT OFFICE.

SAMUEL S. SPEICHER, OF URBANA, INDIANA.

BROADCAST-SOWER.

SPECIFICATION forming part of Reissued Letters Patent No. 10,209, dated September 26, 1882.

Original No. 236,640, dated January 11, 1881. Application for reissue filed June 17, 1882.

*To all whom it may concern:*

Be it known that I, SAMUEL S. SPEICHER, a citizen of the United States, residing at Urbana, in the county of Wabash and State of Indiana, have invented certain new and useful Improvements in Broadcast-Sowers; and I do declare the following to be a full, clear, and exact description of the invention, such as will enable others skilled in the art to which it appertains to make and use the same, reference being had to the accompanying drawings and the letters and figures of reference marked thereon, which form a part of this specification.

My invention relates to that class of broadcast sowers wherein the grain is fed through a feed-opening in the bottom of a receptacle by means of a vibrating plate, and is scattered by falling on a revolving wheel provided with distributing-wings and rotated by a cord passing around the axle thereof and attached at each end to a reciprocating rod operated by hand.

Heretofore sowers of this class have been defective in several particulars, some of which are as follows: The vibrating feed-plate has been placed directly against the bottom of the grain-receptacle, thereby making a broad contact-surface, which rendered the machine liable to be easily choked by chaff or bits of straw, and its successful operation was impaired by the lodgment of grit or dirt between the vibrating plate and the bottom of the grain-receptacle. The wings of the distributing-wheel were also so constructed that the grain was provided with no detent to force it to leave the distributing-plate radially, and much of it would rise nearly vertically and drop at the feet of the operator; and, further, the reciprocating rod and device for rotating the distributing-plate have heretofore been placed below said plate, causing the arm of the operator to come in the line of and partly interrupt the flow of scattering grain, and also necessitating the use of cumbersome framing below the grain-receptacle to form a bearing for the distributing-wheel and to support and guide the reciprocating rod.

To provide a sower in which these and other difficulties shall be obviated is the object of my invention; and it consists, first, in providing the feed-opening with a thin projecting metallic rim combined with a vibrating feed-plate resting thereon; second, in constructing the distributing-wings in a double reversed curve outline in cross-section; third, in placing the reciprocating rod and operating device above the distributing-wheel and supporting the rod in bearings in the extended sides of the receptacle-box; and, fourth, in certain details of construction hereinafter more specially described and claimed.

Figure 5:
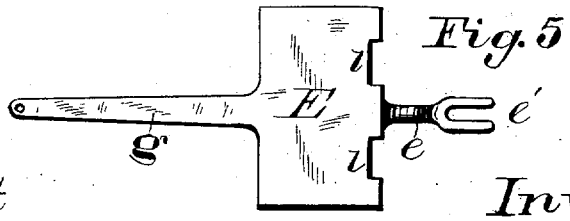
Figure 2:
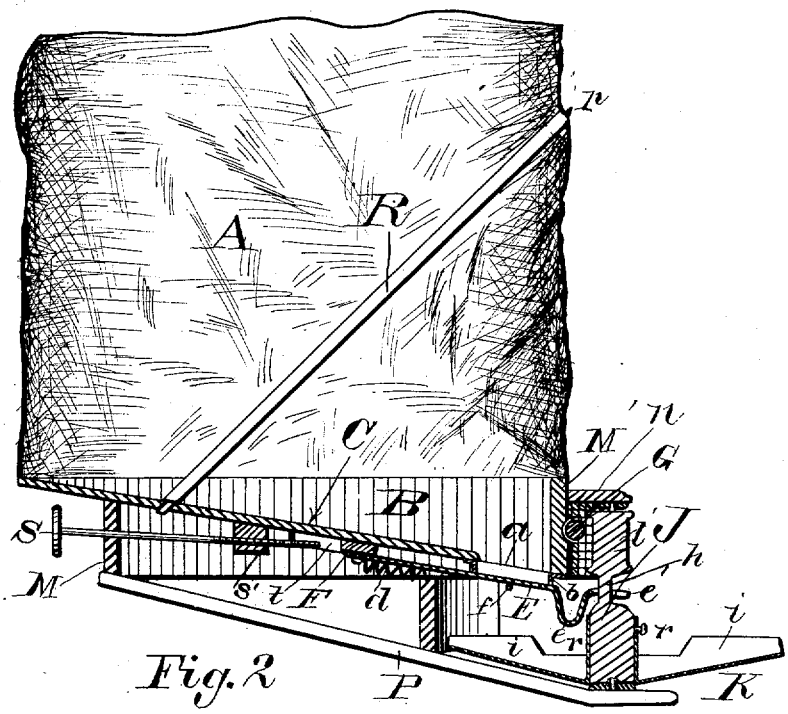
Figure 3:
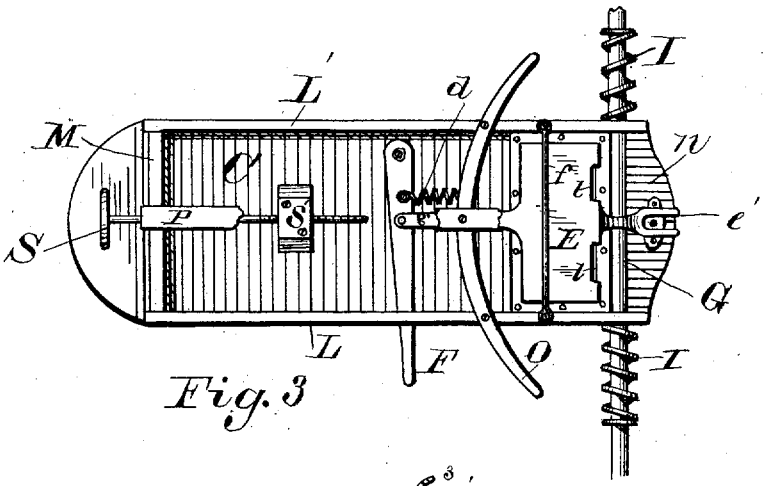
Figure 4:
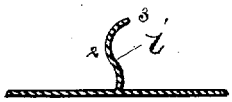

In the accompanying drawings, which form a part of this specification, Figure 1 is a perspective view of my improved sower. Fig. 2 is a longitudinal sectional view, and Fig. 3 a bottom plan view, (with the distributing-wheel removed,) of the same. Figs. 4 and 5 are details to be referred to.

Similar letters refer to similar parts throughout the several views.

A is a textile-fabric bag, secured to the top of a box, B, having a diagonal bottom, *c*, in which is a feed-opening, *a*. Surrounding the feed-opening *a* is a downwardly-projecting thin metallic lip or rim, *b*, and bearing against this lip is the reciprocating feed-plate E, provided with a forwardly-projecting downwardly-curved tongue, *e*, having a bifurcated end, *e'*, and a backwardly-projecting finger, *g*, pivoted at its outer end to a hand-lever, F, which is provided with a retracting-spring, *d*. To avoid as much friction as possible, plate E rests on a round transverse metallic bar, *f*, arranged directly beneath it.

The box B is formed of the side pieces, L L', and end pieces, M and M', with the diagonal bottom extending between side pieces, L and L', in a line from the top of rear end piece, M, to the bottom of front end piece, M'. The side pieces, L and L', are extended in front a short distance beyond the end piece, M, and furnish bearings for the reciprocating rod G, the customary springs I being attached directly to the side pieces, L and L'.

K is the distributing-wheel, the spindle J of which is provided near the middle of its length with a small crank or eccentric, *h*, which as the wheel K rotates vibrates the plate E through the medium of the arm *e*, having bifurcated end $e'$, and has at its upper end the enlarged portion or spool $l'$, around which the cord H makes one turn from front to rear with the crossing in front, the ends of said cord being secured to the reciprocating rod G in the usual manner. The upper end of the spindle J is journaled in a bearing on the under side of a cross-piece, $u$, secured at each end to the top of the extended side pieces, L and L′, as shown, the lower end of said spindle being supported in a bearing on a bar, P, the rear end of which is secured to the bottom of the rear end piece, M, and which passes under and is secured to the curved deflector O, said deflector being fastened at each end by screws or other suitable means to the under side of side pieces, L and L′. By this arrangement of parts the cumbersome framing heretofore employed for supporting the wheel K and rod G is dispensed with and a neater, lighter, and less expensive machine secured, while the rotating mechanism and the arm of the operator are kept above the flow of the scattering grain.

The distributing-wings $i$ of the wheel K, I construct with longitudinal reversed curves, as illustrated in cross-section, Fig. 4, so that they detain the grain, prevent it rising over the wings, and by checking its upward movement force it to leave the distributing-wheel radially. As the wings rise from the distributing-plate they curve to a point, 2, (see Fig. 4,) and from thence to their upper edges, 3, they curve in the opposite direction. As the distributing-wheel revolves in one direction the curve in the wing up to point 2 serves as a detent to the grain, and as the wheel revolves in the opposite direction the curve from point 2 to point 3 serves a similar purpose.

It has been found by experience that when the wings $i$ are carried at or near the same height to the center of the wheel K a portion of the grain, as it falls onto the distributing-wheel at the center, is struck by the upper edge of the wings and is thrown off without entering into the detent formed therein. To obviate this, from the center of the wheel a short distance outward I cut the wings away to near the center line, as shown at $r$, Figs. 1 and 2. This insures the grain entering into the detent, no matter in which direction the wheel is revolved, and forces it to leave the wheel radially.

The bifurcated tongue $e$ joins the vibrating plate E at nearly right angles, and, passing down, is curved and rises to the point where it is extended into the bifurcated end $e'$. By this construction the tongue is prevented from arresting the passage of straw or chaff through the feed-opening, and thereby choking the machine.

The forward edge of plate E is provided with extended shallow recesses $l$ $l$, which assist, as plate E vibrates, by means of eccentric spindle J, in clearing the feed-opening of any short straw or chaff which might interrupt the feed.

The hand-lever F, which regulates the feed by drawing back the vibrating plate E by means of the finger $g$, pivoted thereto, is pivoted at its inner end to the diagonal bottom C of box B, the other end extending through a slot, $t$, in the side piece, L, which serves to guide and keep it in place. The width of the feed-opening and the amount of grain sown is regulated by a set-screw, S, which passes through the end piece, M, and nut $s'$, secured to bottom C, and serves as an adjustable stop for the hand-lever F.

Heretofore it has been customary to provide the box B at the forward end with a fixed vertical standard to sustain the textile-fabric grain-receptacle A, and at the rear with a similar one, to which was attached the end of the supporting or carrying strap D.

In my improved machine I provide a removable rod, R, fitting into a socket in the bottom C, and provided with a point, $p$, to engage with the textile fabric near the upper edge of the receptacle A, and the supporting or carrying strap D, I secured directly to the upper edge of the rear end of the textile-fabric bag. By this arrangement I decrease the weight of the machine, add to the convenience of the operator in carrying it, and materially reduce the space of packing and shipping.

Having thus described my invention, what I claim as new, and desire to secure by Letters Patent, is—

1. In a hand broadcast seed-sower, the vibrating feed-plate E, in combination with the downwardly-projecting thin lip or rim $b$, surrounding the feed-opening from the grain-receptacle, substantially as described.

2. The distributing-plate K, in combination with the reversed curved wings $i$ $i$, substantially as set forth.

3. The combination of the eccentric spindle J, provided at its lower end with the distributing-wheel K, having reversely-curved wings $i$ $i$, and at its upper end with the spool $l$, the crank or eccentric $h$, placed between the wheel and spool, and the reciprocating rod G and cord H, arranged above the wheel, all substantially as shown and described.

4. In a seed-sower, a vibrating plate, E, provided with the tongue $e$, bent at nearly right angles, as shown, curved upward and outward, and terminating in bifurcated end $e'$, to engage the eccentric spindle J, as described.

5. In a seed-sower, a vibrating plate, E, provided with the extended shallow recesses $l$ $l$, substantially as described and shown.

6. In a seed-sower, a vibrating plate, E, provided with the extended shallow recesses $l$ $l$, in combintion with the round metallic bar $f$, substantially as shown and described.

7. In a hand-sower, the bar P, secured at one end to the box B, and provided at the other with a bearing for wheel K, in combination with and secured to the deflector O, secured at each end to box B, substantially as shown and described.

8. The combination, with the vibratory plate

E, having shallow recesses *l l*, of the hand-lever F, set-screw S, and spring *d*, said lever being pivoted at one end to the inclined bottom C, and extending through a slot, *t*, in the side piece, L, substantially as shown and described.

9. The removable sustaining-rod R, in combination with the grain-receptacle of a seed-sower, substantially as and for the purpose set forth.

SAMUEL S. SPEICHER.

Witnesses:

GEO. W. LAMBERT,

CHAS. FRUSHOUR.